(12) United States Patent
Ismai

(10) Patent No.: US 6,357,580 B1
(45) Date of Patent: Mar. 19, 2002

(54) BELT-TYPE CARRIER SYSTEM

(75) Inventor: Hirohisa Ismai, Gunma (JP)

(73) Assignee: I. Tech Inc., Gunma (JP)

( * ) Notice: Subject to any disclaimer, the term of this patent is extended or adjusted under 35 U.S.C. 154(b) by 0 days.

(21) Appl. No.: 09/587,298

(22) Filed: Jun. 5, 2000

(30) Foreign Application Priority Data

Jun. 7, 1999 (JP) .......... 11-159718
May 16, 2000 (JP) .......... 2000-142992

(51) Int. Cl.[7] .......... B65G 17/16; B65G 17/32; B65G 17/34; B65G 17/12; B65G 47/00
(52) U.S. Cl. .......... 198/793; 198/343.2; 198/802
(58) Field of Search .......... 198/343.2, 793, 198/802

(56) References Cited

U.S. PATENT DOCUMENTS

| | | |
|---|---|---|
| 3,580,388 A | 5/1971 | Resener |
| 3,854,573 A * | 12/1974 | Freier, Sr. .......... 198/343.2 X |
| 4,264,001 A * | 4/1981 | Jensen et al. .......... 198/343.2 X |
| 4,378,874 A | 4/1983 | Schwab |
| 4,712,650 A | 12/1987 | Campbell |
| 4,722,430 A * | 2/1988 | Canziani .......... 198/802 X |
| 4,770,287 A | 9/1988 | Glowatzki |
| 5,230,417 A * | 7/1993 | Sato et al. .......... 198/802 X |
| 5,247,778 A * | 9/1993 | Tisma .......... 198/793 X |
| 5,323,912 A * | 6/1994 | Fan et al. .......... 198/802 X |
| 5,829,575 A * | 11/1998 | Williams .......... 198/678.1 X |
| 5,890,584 A | 4/1999 | Bonnet | |

FOREIGN PATENT DOCUMENTS

DE 35 13 280 8/1986
FR 2 404 153 4/1979

* cited by examiner

*Primary Examiner*—Christopher P. Ellis
*Assistant Examiner*—Gene O. Crawford
(74) *Attorney, Agent, or Firm*—Bachman & LaPointe, P.C.

(57) ABSTRACT

A belt-type carrier system is described, that comprises a guide rail structure having straight and curved sections. The guide rail structure has at least one track extending therealong. A belt extends along the guide rail structure. A drive device is provided for driving the belt along the guide rail structure. A spring plate is put on and fixed to a part of the belt. A flexible mounting member is mounted on the spring plate. The flexible mounting member is flexed when an external stress is applied thereto. A carrier base structure is provided which has at least one follower that runs on the track of the guide rail structure when the carrier base structure moves along the guide rail structure. A universal joint structure is arranged between the flexible mounting member and the carrier base structure.

16 Claims, 13 Drawing Sheets

α : STRESS CONCENTRATION COEFFICIENT
M : BENDING MOMENT
ν : POISSON'S RATIO

SLIGHT REFORMATION

FIG.15
(PRIOR ART)

BELT-TYPE CARRIER SYSTEM

BACKGROUND OF THE INVENTION

1. Field of the Invention

The present invention relates to power carrier systems for carrying articles to a desired position or positions with the aid of a power source, and more particularly to the power carrier systems of a belt-type that uses an endless belt as a carrier unit moving means.

2. Description of the Prior Art

In order to clarify the task of the present invention, one conventional power carrier system of the above-mentioned belt-type will be briefly described with reference to FIG. 15 of the accompanying drawings.

Figure 15:
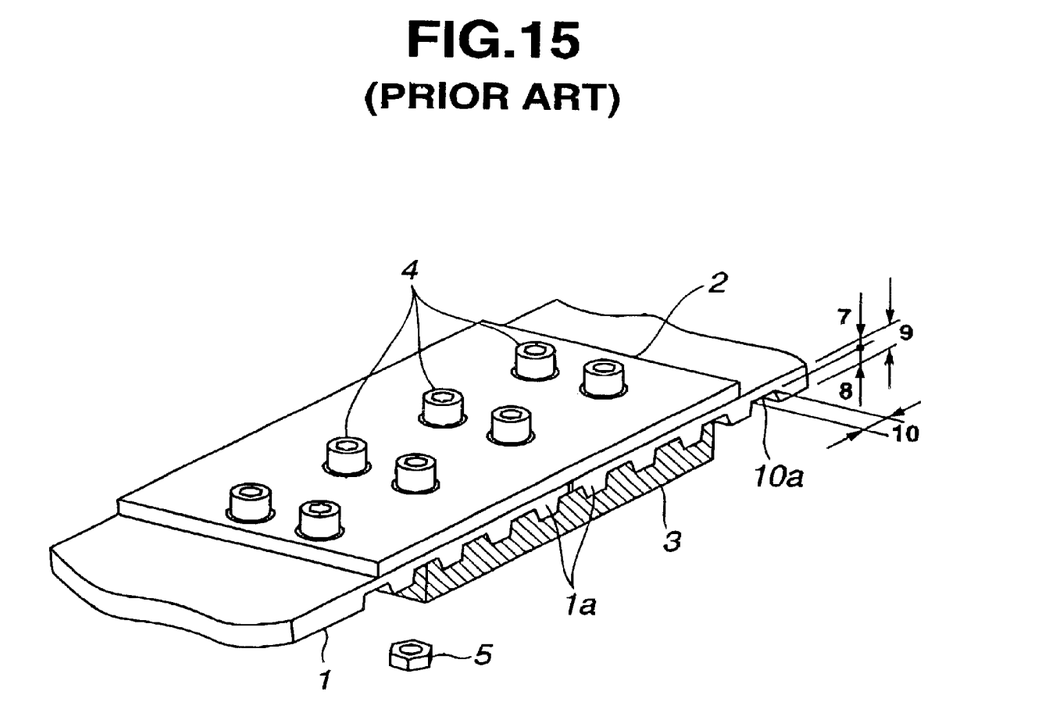
FIG. 15 is a perspective view of an essential part of a conventional belt-type carrier system.

FIG. 15 shows a part of the belt-type carrier system. The carrier system comprises a toothed belt 1. As shown, the belt 1 is formed with teeth on its inner surface. Although now shown in the drawing, the belt 1 extends along a given route to constitute a loop. In order to connect opposed ends 1a of the belt 1, the following end connecting structure is employed. That is, the opposed ends 1a of the belt 1 abut against each other and are put on a first toothed fixing plate 3. As shown, the teeth of the fixing plate 3 and those of the belt 1 are snugly mated with each other. A second fixing plate 2 is put on the opposed ends 1a of the belt 1. A plurality of connecting bolts 4 pass through bores formed in the second fixing plate 2, the ends of the belt 1 and the first fixing plate 3. A plurality of nuts 5 (only one is shown) are tightly engaged with projected lower ends of the bolts 4. With this, the opposed ends 1a of the belt 1 are connected and thus the belt 1 has an endless loop structure. Although not shown in the drawing, a major part of a carrier unit is installed on the second fixing plate 2. As may be understood from FIG. 10, the endless belt 1 is put around spaced pulleys, each pulley having teeth meshed with the teeth of the belt 1. One of the pulleys is a drive pulley that is driven by a power source, such as an electric motor. Thus, when the electric motor is energized, the drive pulley is turned and thus the belt 1 is moved. By changing the direction of electric current fed to the electric motor, the belt 1 and thus the carrying plate on the belt 1 is moved in one and the other directions.

However, due to its inherent construction, the above-mentioned structure for connecting opposed ends 1a of the belt 1 fails to have an adequately flexible characteristic. Thus, if the belt 1 having such opposed end connecting structure is applied to a carrier system that needs turning of the carrier unit, smoothed movement of the belt 1 is not obtained.

SUMMARY OF THE INVENTION

It is therefore an object of the present invention to provide a belt-type carrier system that is free of the above-mentioned drawback.

According to a first aspect of the present invention, there is provided a belt-type carrier system which comprises a guide rail structure having straight and curved sections, the guide rail structure having at least one track extending therealong; a belt extending along the guide rail structure; drive means for driving the belt along the guide rail structure; a spring plate put on and fixed to a part of the belt; a flexible mounting member mounted on the spring plate, the flexible mounting member being flexed when an external stress is applied thereto; a carrier base structure having at least one follower that runs on the track of the guide rail structure when the carrier base structure moves along the guide rail structure; and a universal joint structure arranged between the flexible mounting member and the carrier base structure.

According to a second aspect of the present invention, there is provided a belt-type carrier system which comprises a guide rail structure having a straight rail section, a concavely curved rail section and a convexly curved rail section, the guide rail structure having two mutually perpendicular tracks that extend therealong; a toothed belt having opposed ends that abut against each other, so that the belt constitutes a looped structure; a toothed drive pulley and a tension pulley around which the looped toothed belt is operatively put; a spring plate arranged on the opposed ends of the toothed belt; a flexible metal plate bracket including two leg portions which have lower ends mounted on the spring plate and a bridge portion which extends between upper ends of the two leg portions; a plurality of bolts and nuts by which the spring plate and the lower ends of the leg portions of the flexible metal plate bracket are connected to the opposed ends of the toothed belt; a carrier base structure having two types of followers which run on the tracks of the guide rail structure respectively when the carrier base structure moves along the guide rail structure; and a universal joint structure arranged between the bridge portion of the flexible metal bracket and the carrier base structure, the universal joint structure including a metal ball mounted on the bridge portion of the flexible metal plate bracket and a metal bush held by the carrier base structure, the metal ball being axially and pivotally movably received in the metal bracket.

According to a third aspect of the present invention, there is provided a belt-type carrier system which comprises a guide rail structure having a straight rail section, a concavely curved rail section and a convexly curved rail section, the guide rail structure having two mutually perpendicular tracks that extend therealong, a toothed belt having opposed ends that abut against each other, so that the belt constitutes a looped structure; a toothed drive pulley and a tension pulley around which the looped toothed belt is operatively put; a spring plate arranged on the opposed ends of the toothed belt; an elastic block including two leg portions which have lower ends mounted on the spring plate and a thicker bridge portion which extends between upper ends of the two leg portions; a plurality of bolts and nuts by which the spring plate and the lower ends of the leg portions of the elastic block are connected to the opposed ends of the toothed belt; a carrier base structure having two types of followers which run on the tracks of the guide rail structure respectively when the carrier base structure moves along the guide rail structure; and a universal joint structure arranged between the bridge portion of the elastic block and the carrier base structure, the universal joint structure including a cylindrical metal shaft provided on the bridge portion of the elastic block and a metal bush held by the carrier base structure, the cylindrical metal shaft being axially and rotatably received in the metal bush.

BRIEF DESCRIPTION OF THE DRAWING

Other objects and advantages of the present invention will become apparent from the following description when taken in conjunction with the accompanying drawings, in which.

DETAILED DESCRIPTION OF THE EMBODIMENTS

Figure 1:
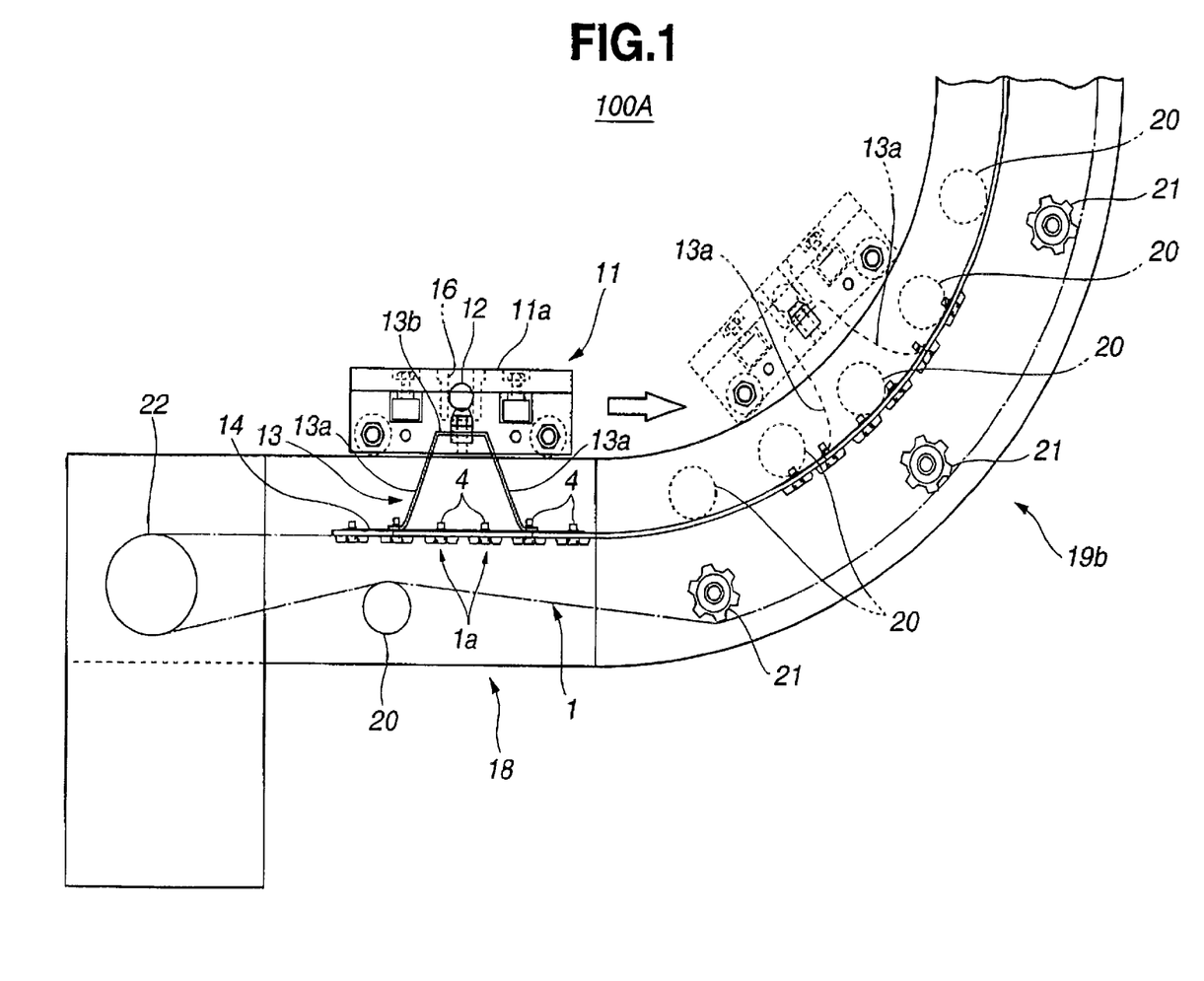
FIG. 1 is a schematically illustrated front view of a belt-type carrier system of a first embodiment of the present invention.
Figure 9:
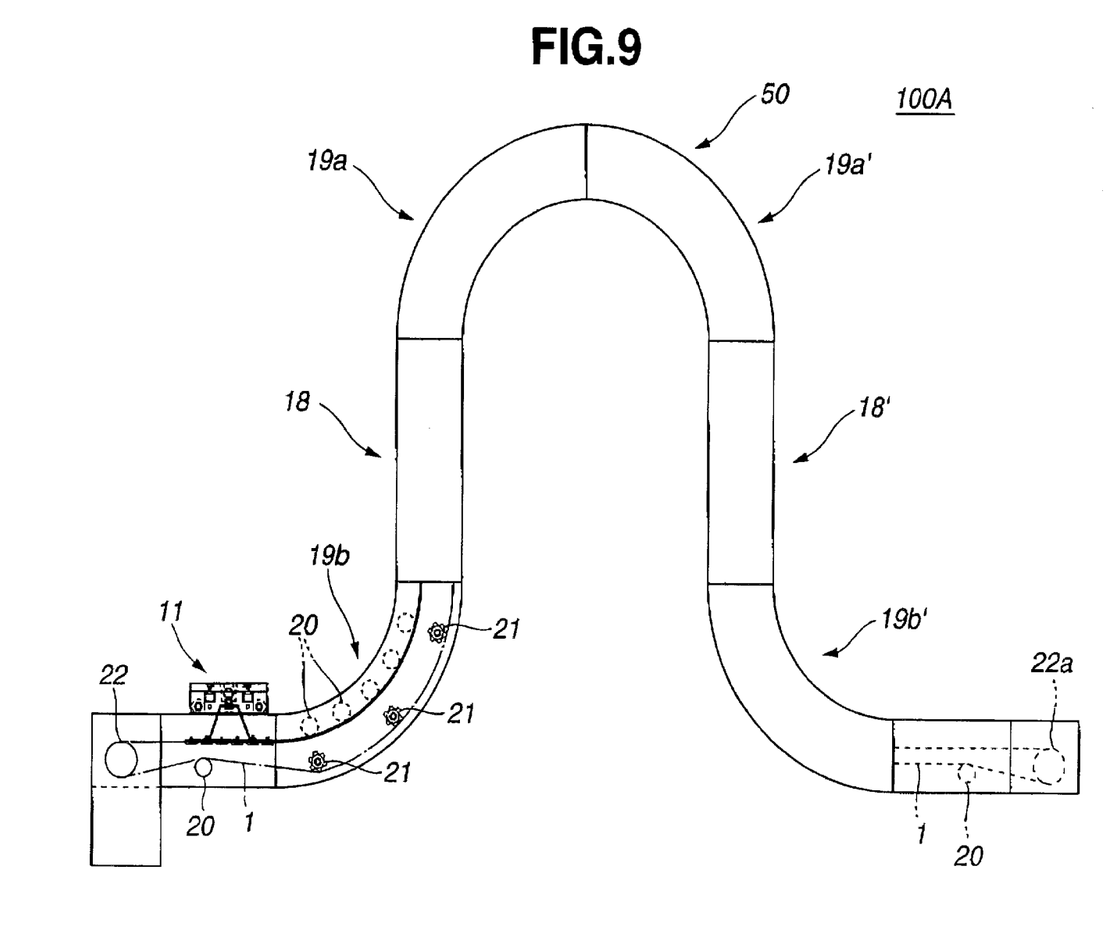
FIG. 9 is a general view of the belt-type carrier system of the first embodiment.

Referring to FIGS. 1 to 9, particularly FIGS. 1 and 9, there is shown a belt-type carrier system 100A which is a first embodiment of the present invention.

As is understood from FIG. 9, the carrier system 100A comprises a curved guide rail structure 50 that includes two (viz., first and second) straight rail sections 18 and 18', two (viz., first and second) convexly curved rail sections 19a and 19a' and two (viz., first and second) concavely curved rail sections 19b and 19b' which are linked in the illustrated manner. That is, the first concavely curved rail section 19b, the first straight rail section 18, the first convexly curved rail section 19a, the second convexly curved rail section 19a', the second straight rail section 18' and the second concavely curved rail section 19b' are linked in order to constitute a generally reversed Ω-shaped guide rail structure 50. Along and in the curved guide rail, there extends a looped belt 1 which has ends put around respectively pulleys 22 and 22a. The pulley 22 is a drive pulley for driving the belt 1 and the other pulley 22a is a tension pulley for applying a suitable tension to the belt 1. A plurality of followers 20 and idlers 21 are installed in the rail structure to guide the traveling of the belt 1. As shown, almost all of the followers 20 are arranged outside of the loop of the belt 1 to guide an upper half of the belt 1 and the idlers 21 are arranged inside of the loop to guide a lower half of the belt 1.

Figure 3:
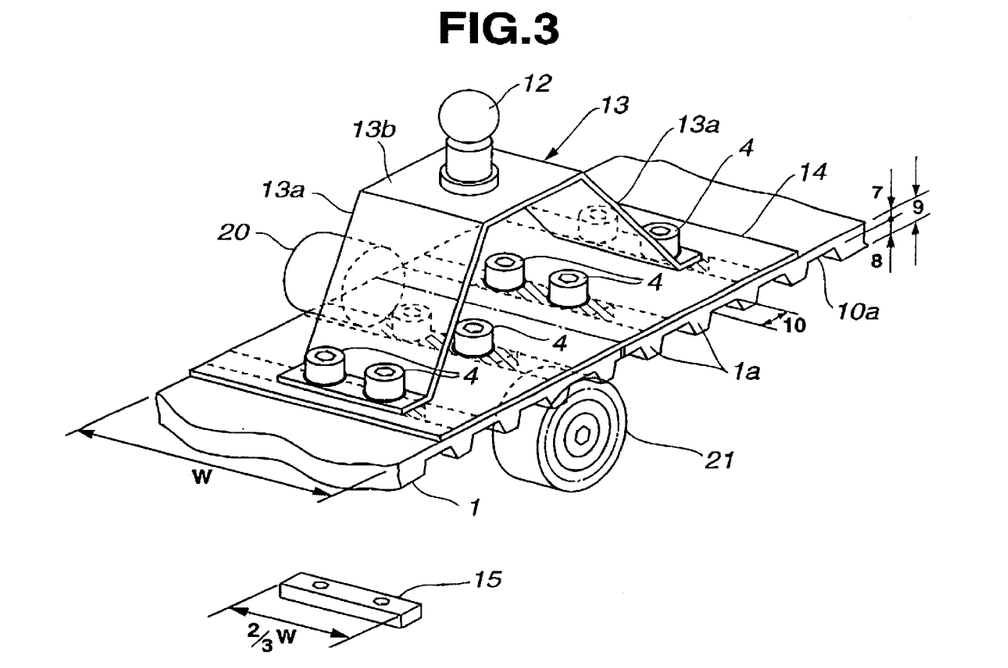
FIG. 3 is a perspective view of the carrier unit.

As will be seen from FIG. 3, these followers 20 and the idlers 21 are in engagement with lateral edge portions of the belt 1, for the purpose that will become apparent as the description proceeds.

On the upper half of the looped belt 1, there is installed a carrier unit 11 in a manner as will be described in the following.

Referring to FIG. 1, there is shown the detail of a left part of the carrier system 10A. As shown, the belt 1 is of a toothed type that has teeth at its inner surface and the carrier unit 11 is mounted on an outer surface of the belt 1 to move therewith.

The carrier unit 11 generally comprises a flexible metal plate bracket 13 that is mounted on the belt 1 and a carrier unit base structure 11a that is connected to the flexible bracket 13 though a ball-joint structure, as will be described in detail hereinafter.

As is seen from FIGS. 2A, 2B, 2C, 3 and FIG. 4, the carrier unit 11 comprises a rectangular spring plate 14 put on the belt 1.

As shown in FIG. 3, in the illustrated embodiment, the spring plate 14 is put on opposed ends 1a of the belt 1. The opposed ends 1a abut against each other to constitute therebetween one tooth space, as shown. A plurality of connecting bolts 4 pass through bores formed in the spring plate 14 and the belt 1 to be engaged with elongate joint nuts 15. As shown, in the illustrated embodiment, the joint nuts 15 are put in every two of the tooth spaces of the belt 1. However, if desired, the joint nuts 15 may be put in all of the tooth spaces of the zone covered with the spring plate 14.

The thickness of the spring plate 14 is smaller than the thickness "7" of a base part of the belt 1. In the drawing of FIG. 3, the entire thickness of the belt is indicated by "9", the height of each tooth is indicated by "8" and the width of each tooth space 10a of the belt 1 is indicated by "10".

The flexible plate bracket 13 has a generally U-shaped structure including two leg portions 13a and a bridge portion 13b which extends between upper ends of the two leg portions 13a.

These two leg portions 13a incline outward from each other. Flanged lower ends of the leg portions 13a are fixed to the spring plate 14 and the belt 1 through the bolts 4.

The joint nuts 15 are constructed of a metal with an anticorrosion, such as stainless steel, aluminum or the like. As is seen from FIG. 3, each joint nut 15 has a length "(⅔)×W" that is about ⅔ of the width "W" of the belt 1.

Figure 2A:
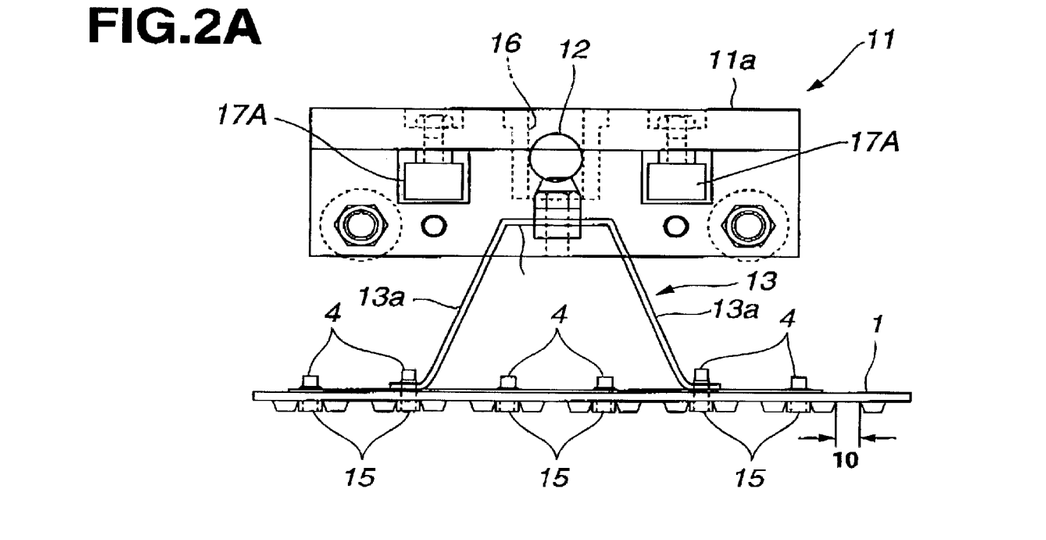
FIGS. 2A, 2B and 2C are front, plan and side views of a carrier unit mounted on a belt, which are employed in the first embodiment.
Figure 2B:
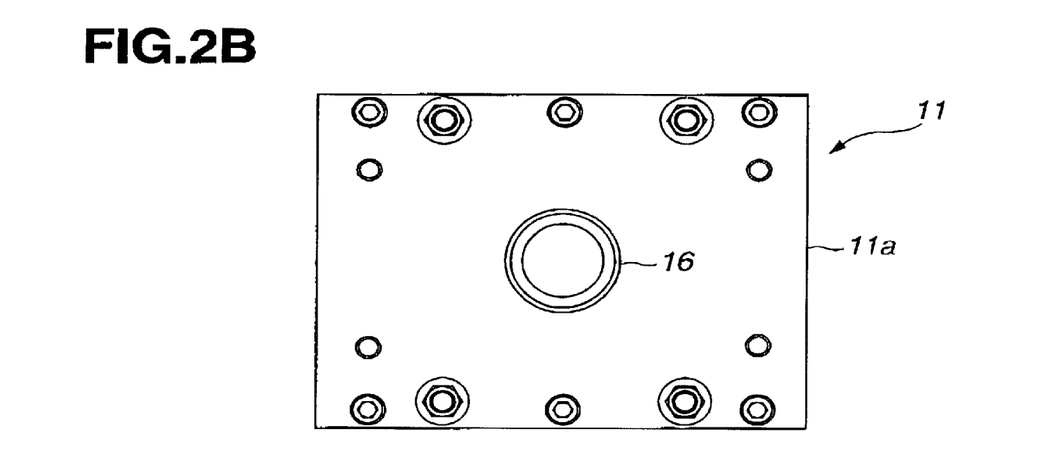
Figure 2C:
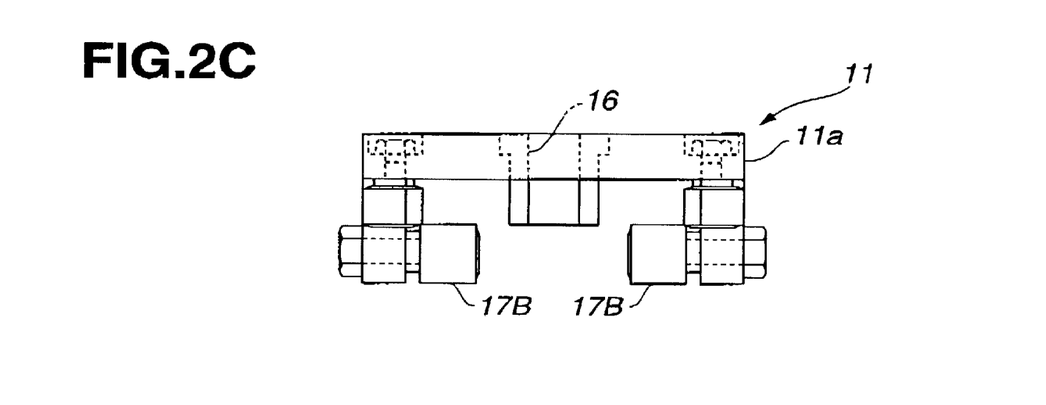

As is well shown in FIGS. 2A, 2B and 2C, the flexible plate bracket 13 is provided at its bridge portion 13b with a metal ball 12. That ball 12 is pivotally and axially movably received in a metal bush 16 that is installed in the base structure 11a. That is, is the ball 12 and the bush 16 constitute a so-called "universal and axially movable ball-joint (12, 16)" with which the base structure 11a is pivotally and axially movable relative to the fixed ball 12.

As is seen from FIG. 2A, the base structure 11a is provided with two pairs of followers 17A each pair run along and on first parallel tracks (not shown) formed on the guide rail structure 50 (see FIG. 9). Furthermore, as is seen from FIG. 2C, the base structure 11a is provided with one pair of followers 17B that run along an on second parallel tracks (not show) formed on the guide rail structure 50. As is seen from these drawings, an axis of each follower 17A is perpendicular to that of the follower 17B. That is, the first parallel tracks are perpendicular to the second parallel tracks.

Figure 4:
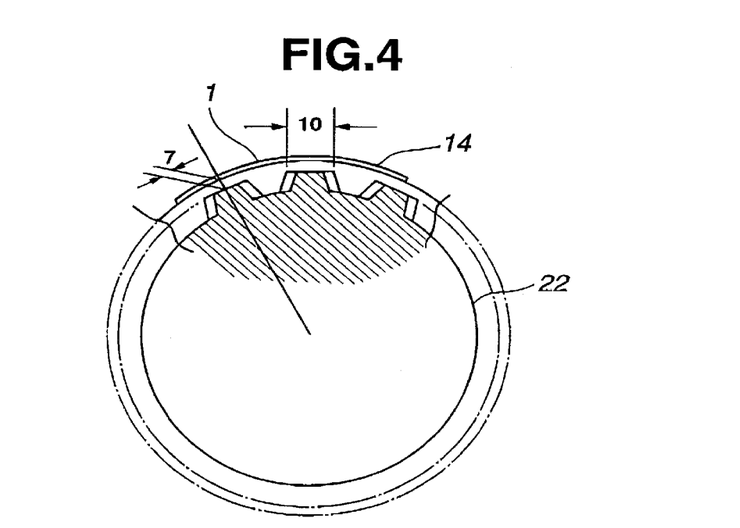
FIG. 4 is a schematic view of an idler pulley to which the belt is operatively applied.
Figure 5A:
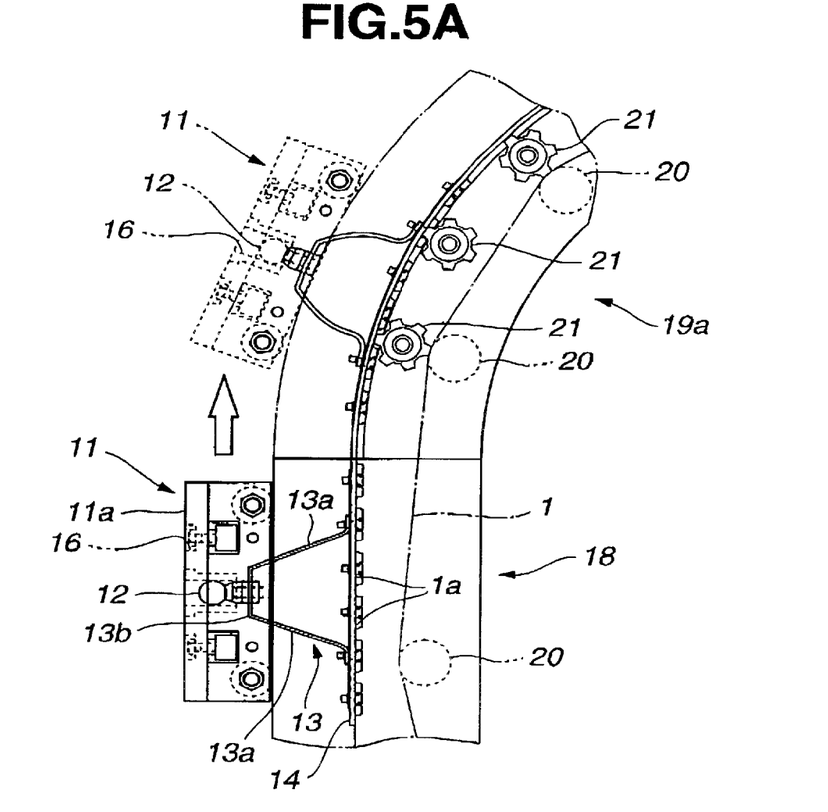
FIGS. 5A and 5B are views showing the posture of the carrier unit when the carrier unit is moving along a convexly curved path.
Figure 5B:
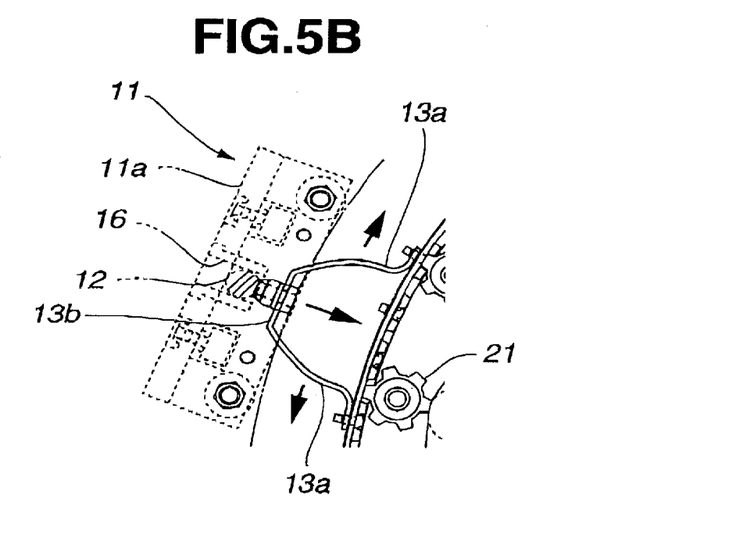
Figure 6A:
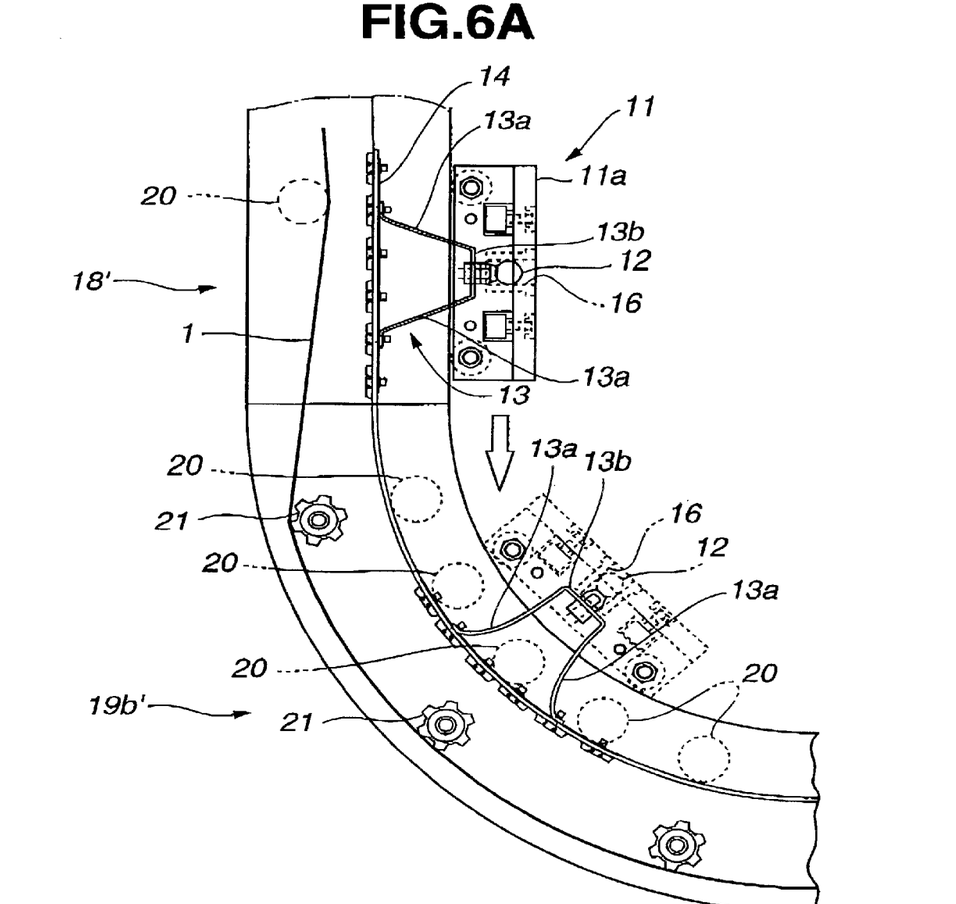
FIGS. 6A and 6B are views showing the posture of the carrier unit when the carrier unit is moving along a concavely curved path.
Figure 6B:
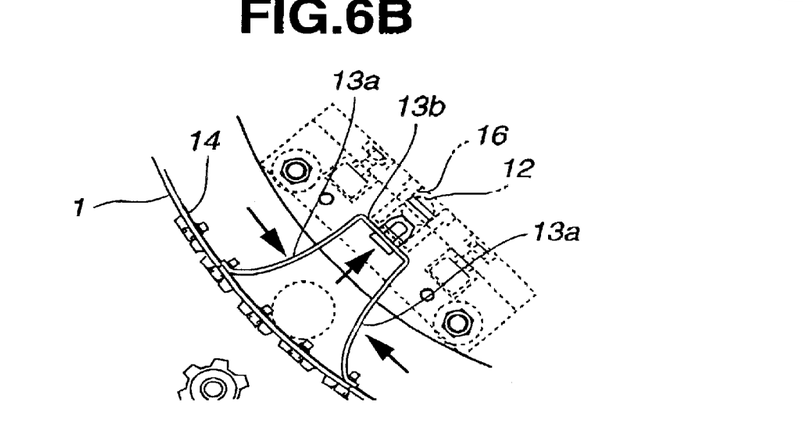

Referring to FIG. 4, there is shown the detail of the drive pulley 22 for driving the belt 1. The drive pulley 22 is powered by an electric motor (not shown). The drive pulley 22 is formed with a plurality of teeth that are meshed with the teeth of the belt 1. Thus, when the electric motor becomes energized to drive the drive pulley 22 in one or the other direction, the belt is moved in one or the other direction. As shown, the top of each tooth of the drive pulley 22 is narrower than the tooth space "10" of the belt 1. With this, the belt 1 suffers a certain play when the drive pulley 22 changes its rotation direction. It is to be noted that the tension pulley 22a has substantially the same construction as the drive pulley 22. However, due to provision of a tension means (not shown), this tension pulley 22a is biased in an outside direction to apply the belt 1 with a suitable tension.

In the following, operation of the belt-type carrier system 100A of the first embodiment of the present invention will be described with reference to the drawings.

For ease, the explanation will be commenced with respect to the condition as shown in FIG. 9.

When, as is seen from this drawing, the drive pulley 22 is driven by the electric motor in a direction, that is, in a clockwise direction in the drawing, the belt 1 makes a right-handed rotation and thus the carrier unit 11 is moved rightward having the followers 17A and 17B (see FIGS. 2A and 2B) run on and along the respective tracks of the guide structure 50.

Upon this, as is seen from FIG. 1, the carrier unit 11 is forced to run along the concavely curved rail section 19b. During this running, the opposed ends 1a of the belt 1 on which the carrier unit 11 is mounted can smoothly flex due to the flexibility of the spring plate 14 by which the opposed ends 1a of the belt 1 are fixed. Thus, movement of the belt 1 is smoothly carried out. Of course, due to function of the "universal and axially movable ball-joint (12, 16)" arranged between the flexible plate bracket 13 and the base structure 11a, and due to the flexibility of the bracket 13, the base structure 11a can smoothly follow the movement of the belt 1. That is, when the carrier unit 11 is moving along the concavely curved rail section 19b, the flexible plate bracket 13 is compressed and thus the leg portions 13a of the same are flexed inwardly keeping a flexible connection between the belt 1 and the base structure 11a of the carrier unit 11. Upon occurrence of this inward flexing of the leg portions 13a, the ball 12 slides inward or downward in the bush 16 of the base structure 11a.

Due to continuous movement of the belt 1, the carrier unit 11 comes to the straight rail section 18 (see FIG. 9) and then to the convexly curved rail section 19a. Due to the same reason as mentioned hereinabove, the opposed ends 1a of the belt 1 on which the carrier unit 11 is mounted can smoothly flex and thus smoothly moves along the guide way. This will be well understood from FIG. 5A. As is seen from FIGS. 5A and 5B, when the carrier unit 11 is moving along the convexly curved rail section 19a, the flexible plate bracket 13 is compressed and the leg portions 13a of the same are flexed outwardly, as shown, keeping the flexible connection between the belt 1 and the base structure 11a of the carrier unit 11.

When, due to the continues movement of the belt 1, the carrier unit 11 comes to the other convexly curved rail section 19a' (see FIG. 9), the flexible connection between the belt 1 and the base structure 11a of the carrier unit 11 is kept like the case in the section 19a. Then, the carrier unit 11 comes to the other straight rail section 18' (see FIG. 9) and then to the other concavely curved rail section 19b'. As is best seen from FIGS. 6A and 6B, when the carrier unit 11 is moving along the other concavely curved rail section 19b', the flexible plate bracket 13 is compressed and thus the leg portions 13a of the same are flexed inwardly keeping the flexible connection between the belt 1 and the base structure 11a of the carrier unit 11.

When finally the carrier unit 11 comes near the tension pulley 22a (see FIG. 9), the opposed ends 1a of the belt 1 on which the carrier unit 11 is mounted are rounded on the tension pulley 22a. Upon this, due to the flexibility of the spring plate 14 (see FIG. 4), the meshed engagement between the teeth of the tension pulley 22a and the teeth of the belt 1 is assuredly maintained.

When the belt 1 is moved in the opposite direction by the drive pulley 22, the opposed ends 1a of the belt 1 on which the carrier unit 11 is mounted and the carrier unit 11 per se show similar behavior to the above-mentioned one.

In the following, the behavior of them taken during the movement of the belt 1 will be analyzed with reference to drawings.

When the opposed ends 1a of the belt 1 on which the rectangular spring plate 14 is mounted are put around the pulley 22 or 22a, the spring plate 14 is applied with a bending stress "σb" that is represented by the following equation:

$$\sigma b = (t \times E)/D \qquad (1)$$

wherein:
σb: bending stress (N/mm$^2$)
t: thickness of the spring plate (mm)
D: diameter of the pulley (mm)
E: elastic coefficient of the spring plate (N/mm$^2$)

If a diameter (viz., twice as long as a radius of curvature) of the above-mentioned concavely or convexly curved rail section 19a, 19a', 19b or 19b' is used in the equation (1) in place of the diameter "D" of the pulley, a bending stress applied to the spring plate 14 when the opposed ends 1a of the belt 1 runs along such curved rail section is obtained. In fact, when the opposed ends 1a of the belt 1 run along such curved rail section, both the bending stress and a tensile stress are applied to the spring plate 14. It is said that if the sum of such stresses exceeds a fatigue limit possessed by the spring plate 14, the life of the spring plate 14 becomes very shortened.

Accordingly, for allowing the spring plate 14 to have a longer life, it becomes necessary to increase the value of the denominator of the right side of the equation (1) or decrease the value of the numerator of the same. Thus, if a larger space is provided for the carrier system 100A, the curved rail section 19a, 19a', 19b and 19b' should have a larger radius of curvature "24" (see FIG. 1). Furthermore, it is preferable to select a metal plate as the spring plate 14, that has a less elastic coefficient. The tensile stress is the stress applied to the sectional area of the spring plate 14, the sectional area being the product of the thickness of the plate 14 and the width of the same. That is, changing of the thickness of the plate 14 induces necessity of changing the width of the same. However, the width of the spring plate 14 has no influence on the bending stress. Accordingly, in order to defuse the being stress applied to the spring plate 14, considering only the thickness of the plate 14 and the radius of curvature of the curved rail sections 19a, 19a', 19b and 19b' is necessary.

The spring plate 14 is formed with openings through which the connecting bolts 4 pass. Thus, when the spring plate 14 is bent, concentration of stress takes place around each opening. The concentrated stress around the opening is obtained from the graph of FIG. 8. As is seen from this graph, the concentrated stress around the opening shows a maximum value that is about twice as large as a value that is possessed by a solid portion of the plate. This means that if a needed sectional area of the spring plate is not provided, providing larger diameter opening in the plate is preferable. That is, it is necessary to set the bending stress applied to the spring plate 14, that is increased upon concentration of stress, lower than the fatigue limit of the material of the spring plate 14.

As has been mentioned hereinabove, when the carrier unit 11 runs along the concavely and convexly curved rail sections 19b, 19b', 19a and 19a', the leg portions 13a of the flexible plate bracket 13 are flexibly bent inwardly and outwardly. Thus, during movement of the carrier unit 11 along such curved rail sections, the followers 17A and 17B of the base structure 11a are kept pressed against the corresponding tracks of the guide rail structure 50 thereby stably holding the carrier unit 11.

Figure 7:
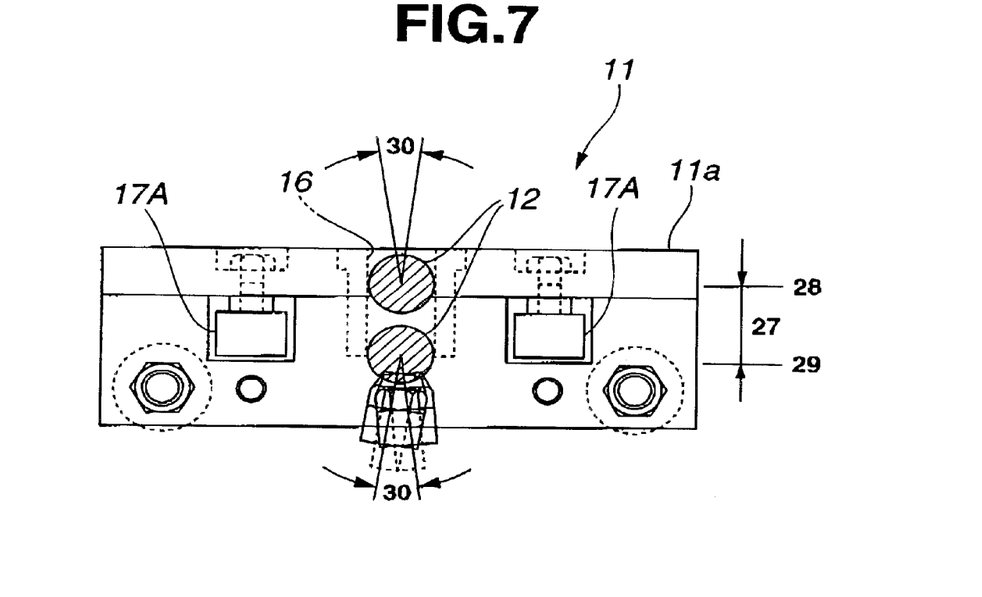
FIG. 7 is an illustration showing movements of various parts of the carrier unit that take place when the carrier unit moves along the curved path.
Figure 8:
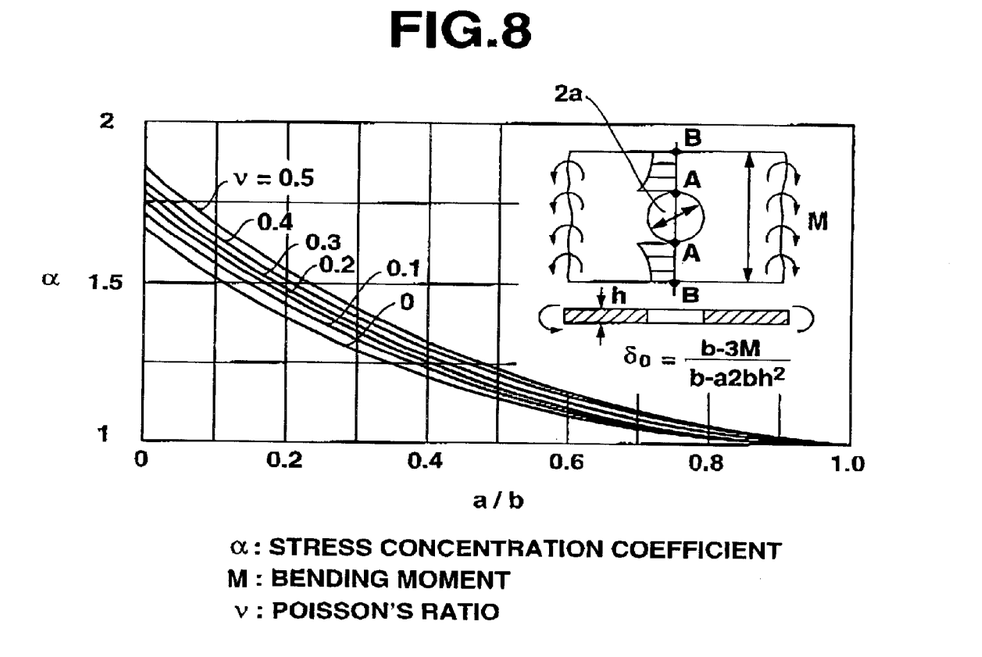
FIG. 8 is a graph showing a characteristic of an apertured band plate.

As is seen from FIG. 7, upon flexion of the leg portions 13a of the flexible plate bracket 13, the ball 12 on the flexible plate bracket 13 is forced to move downward in the bush 16. That is, the ball 12 is allowed to move axially within a given range "27" that has an upper limit "28" and a lower limit "29". Due to function of the universal and axially movable ball-joint (12, 16), the base structure 11a can pivot in a universal direction "30" about the fixed ball 12.

Figure 10:
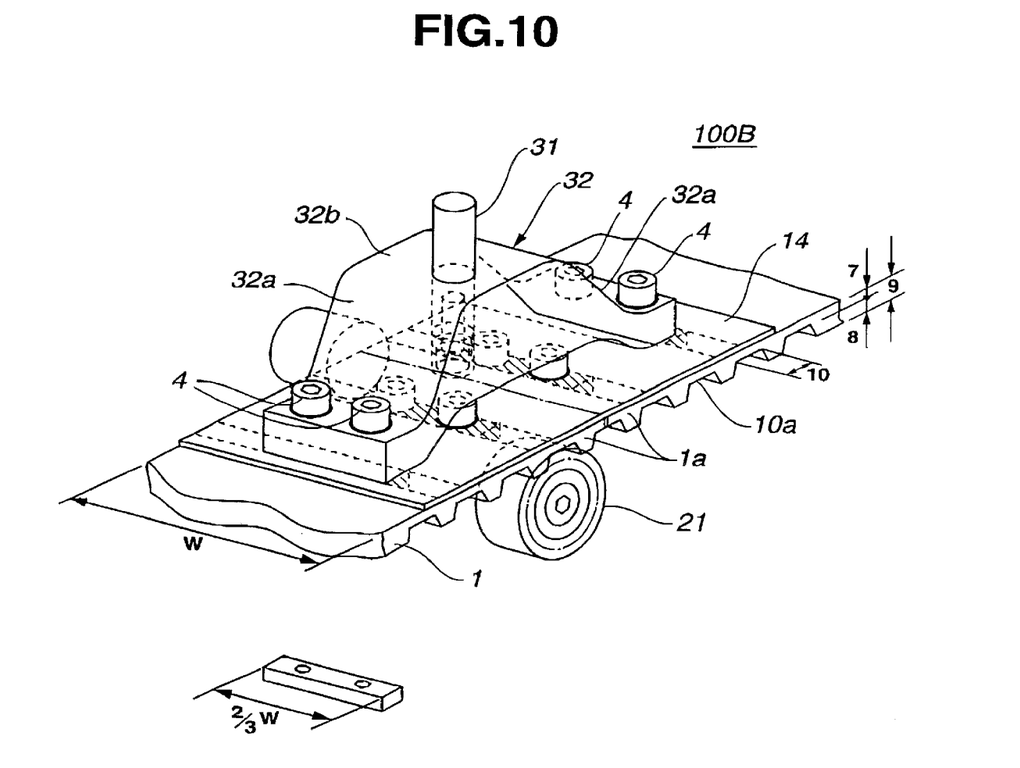
FIG. 10 is a view similar to FIG. 3, but showing a carrier unit employed in a second embodiment of the invention.
Figure 11A:
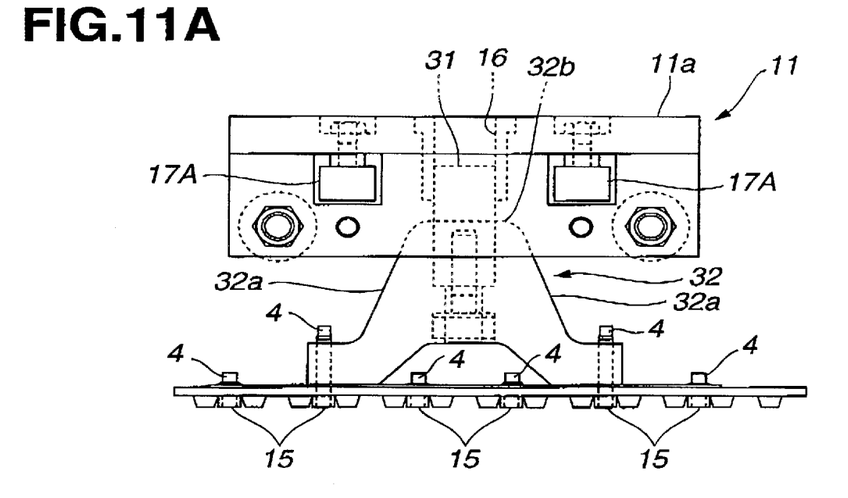
FIGS. 11A, 11B and 11C are front, plan and side views of the carrier unit employed in the second embodiment.
Figure 11B:
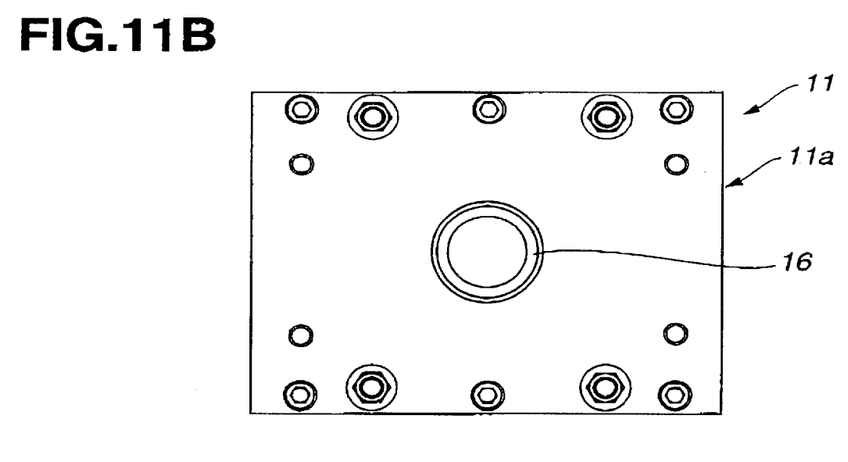
Figure 11C:
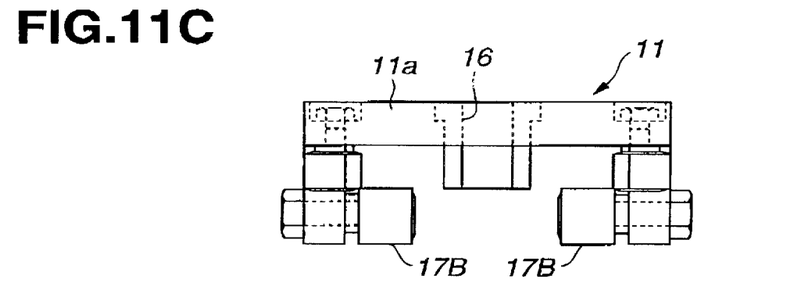

Referring to FIGS. 10 to 14C, particularly FIG. 10, there is shown a belt-type carrier system 100B which is a second embodiment of the present invention.

Since this embodiment is similar to the above-mentioned first embodiment 100A, only parts and constructions that are different from those of the first embodiment will be described in detail in the following.

As shown in FIG. 10, in place of the flexible plate bracket 13 used in the first embodiment 100A, an elastic block 32 made of a urethane rubber or the like is employed in this second embodiment 100B. As shown, the elastic block 32 comprises two short leg portions 32a and a thicker bridge portion 32b which extends between upper ends of the two short leg portions 32a. Flanged lower ends of the leg portions 32a are fixed to the spring plate 14 and the belt 1 through the bolts 4. The elastic block 32 is provided at the thicker bridge portion 32b with a cylindrical metal shaft 31 that extends perpendicularly. As is seen from FIG. 11A, a lower half of the cylindrical shaft 31 is tightly embedded in a bore formed in the bridge portion 32b. The projected upper part of the cylindrical shaft 31 is slidably rotatably received in the bush 16 that is installed in the base structure 11a.

Upon energization of the electric motor, the drive pulley 22 (see FIG. 9) drives the belt 1 to move the carrier unit 11 along a given way defined by the guide rail structure 50 in a manner similar to the first embodiment 100A.

However, in the second embodiment 100B, the following advantageous behavior is expected due to the above-mentioned construction including the elastic block 32 and the cylindrical shaft 31.

Figure 12A:
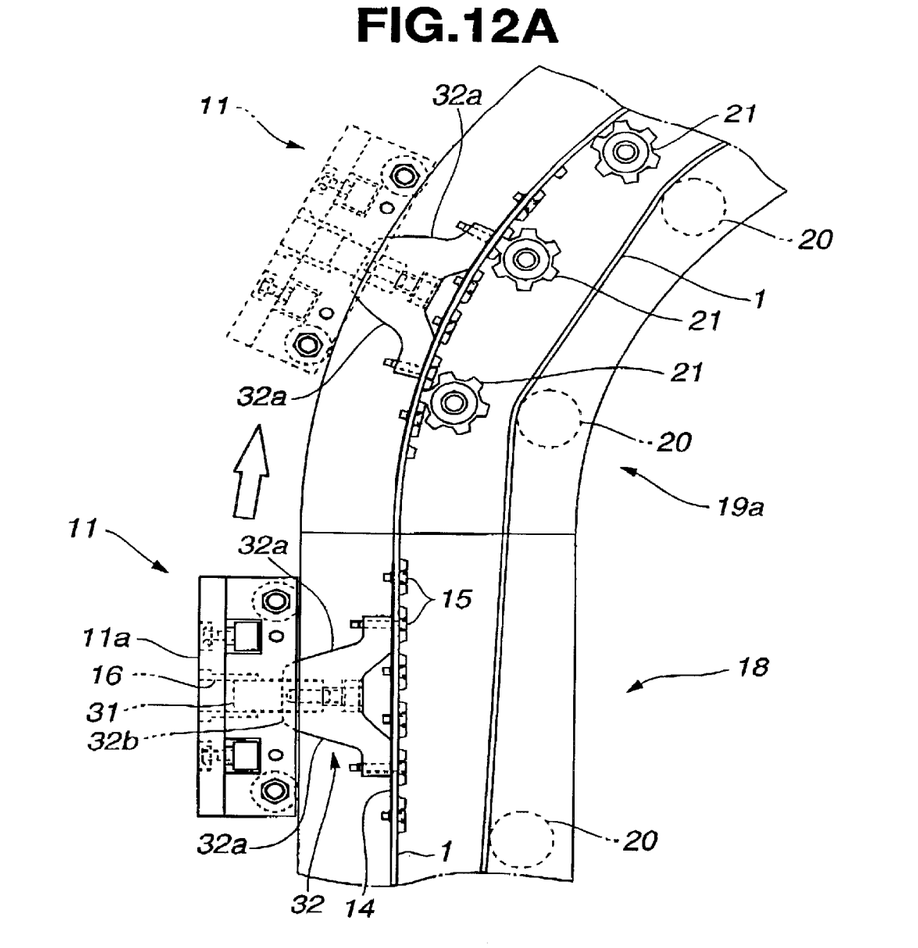
FIGS. 12A and 12B are views showing the posture of the carrier unit of the second embodiment when the same is moving along a convexly curved path.
Figure 12B:
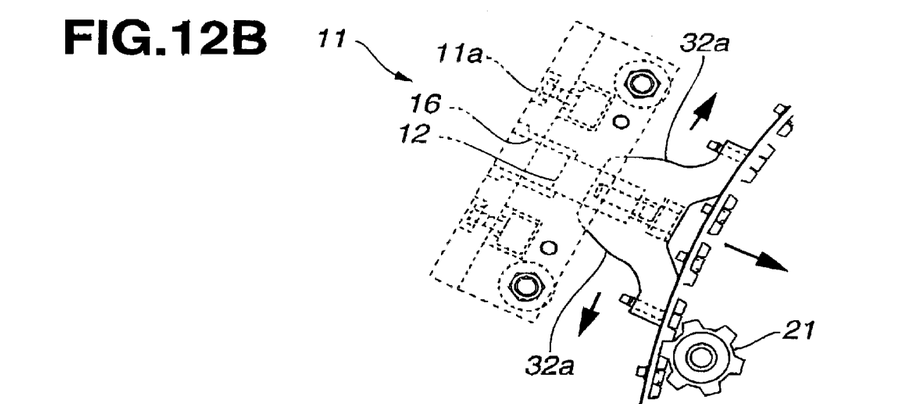

That is, as is seen from FIG. 12A, when the carrier unit 11 is moved from the straight rail section 18 to the convexly curved rail section 19a, the elastic block 32 is compressed similar to the case of the first embodiment 100A. In fact, the compression of the elastic block 32 taking place at this time brings about outward expansion of the two short leg portions 31a of the elastic block 32, as is seen from FIG. 12B. Upon occurrence of this outward expansion, the cylindrical shaft 31 slides inward or downward in the bush 16 of the base structure 11a. That is, as is seen from FIG. 14A, the cylindrical shaft 31 is allowed to move axially within a given range "33" that has an upper limit "34" and a lower limit "35". Of course, during this, a rotatable movement of the base structure 11a relative to the elastic block 32 is also allowed.

Figure 13A:
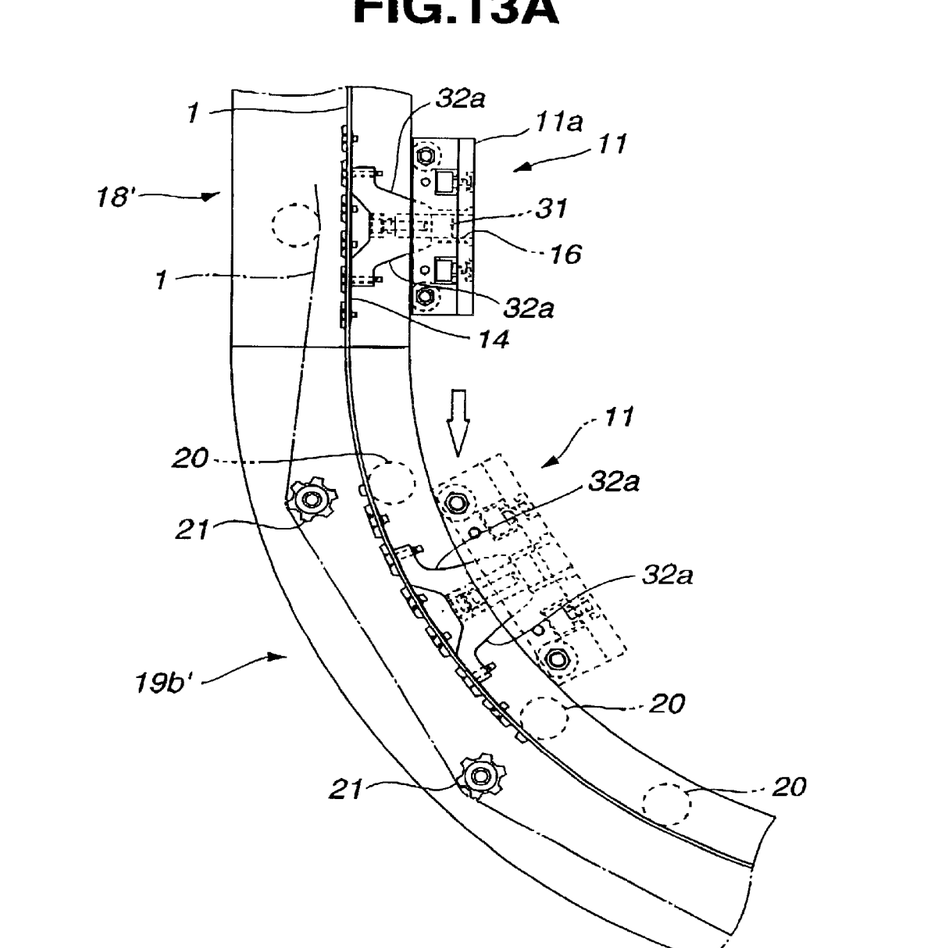
FIGS. 13A and 13B are views showing the posture of the carrier unit of the second embodiment when the same is moving along a concavely curved path.
Figure 13B:
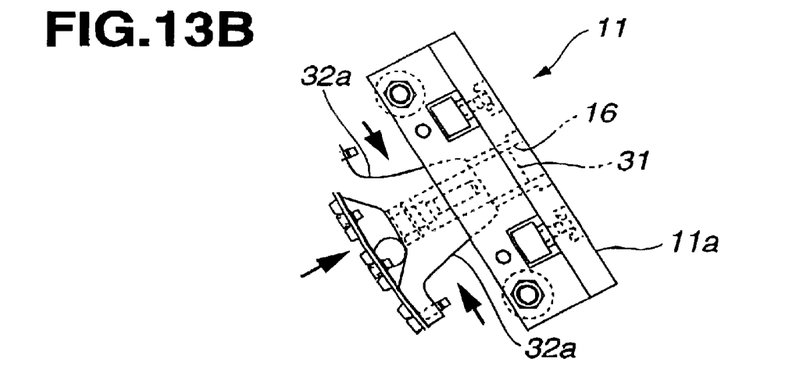
Figure 14A:
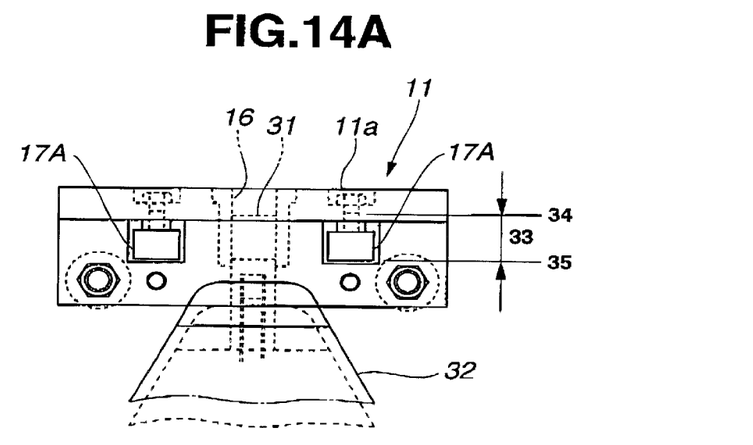
FIGS. 14A, 14B and 14C are schematic view of the carrier unit employed in the second embodiment, showing movement of various parts of the carrier unit under movement of the carrier unit along the curved path.
Figure 14B:
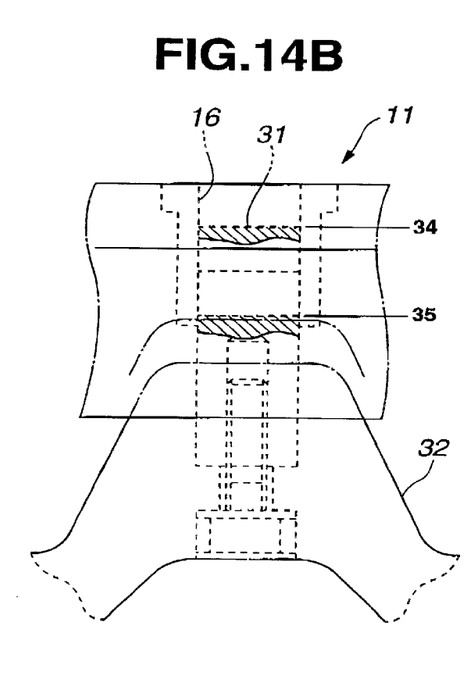
Figure 14C:
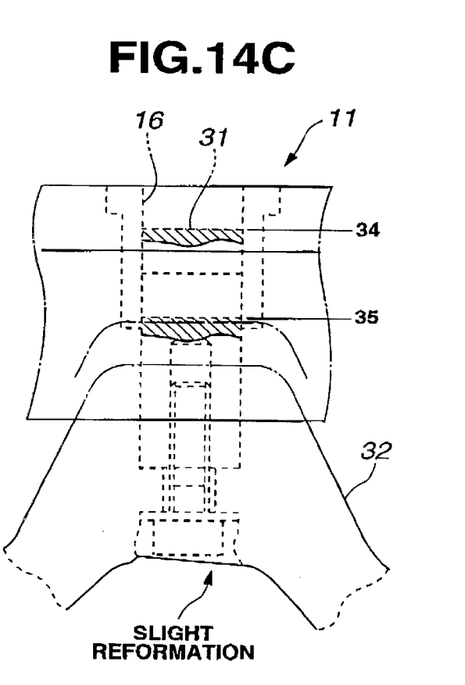

While, as is seen from FIG. 13A, when the carrier unit 11 is moved from the straight rail section 18' to the concavely curved rail section 19b', the elastic block 32 is compressed similar to the case of the first embodiment 100A. In fact, the compression of the elastic block 32 taking at this time brings about inward expansion of the two short let portions 31a of the elastic block 31, as is seen from FIG. 13B. Upon occurrence of this inward expansion, the cylindrical shaft 31 slides inward or downward in the bush 16 of the base structure 11a. That is, as is seen from FIG. 14A, the cylindrical shaft 31 is allowed to move axially within the given range "33" and allows the base structure 11a to rotate thereabout.

Due to enlarged contacting area established between the cylindrical shaft 31 and the bush 16, the axial movement of the shaft 31 in the bush 16 and the rotation of the bush 16 relative to the shaft 31 are much assuredly carried out. Thus, in the second embodiment 100B, the movement of the carrier unit 11 and that of the belt 1 per se are much smoothly made as compared with those of the first embodiment 100A.

In other words, in the second embodiment 100B, the belt 1 can be moved with a much higher acceleration and a much heavier article can be handled than in the first embodiment 100A.

This will be well understood from the following canalization.

That is, in the second embodiment 100B, when the electric motor starts to run and/or when the carrier unit 11 comes to the concavely or convexly curved rail section 19b, 19a, 19a' or 19b', the cylindrical shaft 31 is forced to move in the bush 16. During this, due to its nature, the elastic block 32 absorbs various external stresses with a stress absorbing effect higher than that of the flexible plate bracket 13 of the first embodiment 10A. Accordingly, as is seen from FIGS. 14B and 14C, the movement of the carrier unit 11 along such curved section 19b, 19a, 19a' or 19b' can be smoothly carried out only by making a small elastic deformation of the elastic block 32, that is, the portion where a head of a connecting bolt for the cylinder shaft 31 is located. That is, the traction of the carrier unit 11 by the belt 1 is achieved with a less traction loss as compared with the first embodiment 100A. Thus, in the second embodiment, the belt 1 can be moved with a much higher acceleration and a much heavier article can be handled.

Although, in the above-mentioned embodiments 100A and 100B, a belt 1 having opposed ends 1a is used, an endless belt may be used in the present invention. Furthermore, although in the above-mentioned embodiments 100A and 100B, the carrier unit 11 is mounted on the opposed ends 1a of the belt 1, the carrier unit 11 may be mounted on the belt 1 other than the opposed ends 1a.

Although the invention has been described above with reference to the two embodiments of the invention, the invention is not limited to the embodiments described above. Various modifications and variations of the embodiments described above will occur to those skilled in the art, in light of the above teachings.

What is claimed is:

1. A belt-type carrier system comprising:
   a guide rail structure having straight and curved sections, said guide rail structure having at least one track extending therealong;
   a belt extending along said guide rail structure;
   drive means for driving said belt along said guide rail structure;

a spring plate put on and fixed to a part of said belt;

a flexible mounting member mounted on said spring plate, said flexible mounting member being flexed when an external stress is applied thereto;

a carrier base structure having at least one follower that runs on said track of said guide rail structure when said carrier base structure moves along said guide rail structure; and a universal joint structure arranged between said flexible mounting member and said carrier base structure.

2. A belt-type carrier system as claimed in claim 1, in which said flexible mounting member and said spring plate are mounted to said belt by means of a plurality of bolts and nuts.

3. A belt-type carrier system as claimed in claim 1, in which said flexible mounting member is a flexible metal plate bracket that comprises:

two leg portions which have lower ends fixed to said spring plate, and a bridge portion which extends between upper ends of said two leg portions, said bridge portion being connected to said carrier base structure through said universal joint structure.

4. A belt-type carrier system as claimed in claim 3, in which said two leg portions incline outward from each other.

5. A belt-type carrier system as claimed in claim 3, in which said universal joint structure comprises:

a metal ball provided on said bridge portion of said flexible metal plate bracket; and a metal bush held by said carrier base structure, said metal bush receiving therein said metal ball in such a manner that the metal ball can axially move and pivot in said metal bush.

6. A belt-type carrier system as claimed in claim 1, in which said flexible mounting member is an elastic block which comprises:

two leg portions which have lower ends fixed to said spring plate; and a thicker bridge portion which extends between upper ends of said two leg portions, said bridge portion being connected to said carrier base structure through said universal joint structure.

7. A belt-type carrier system as claimed in claim 6, in which said elastic block is constructed of an urethane rubber.

8. A belt-type carrier system as claimed in claim 6, in which said universal joint structure comprises:

a cylindrical metal shaft provided on said bridge portion of said elastic block; and a metal bush held by said carrier base structure, said metal bush receiving therein said cylindrical metal shaft in such a manner that the cylindrical metal shaft can axially move and rotate about its axis in said metal bush.

9. A belt-type carrier system as claimed in claim 1, in which said belt is of a toothed belt that comprises a flat upper surface and a toothed lower surface, said spring plate being put on said flat upper surface.

10. A belt-type carrier system as claimed in claim 5, in which the nuts are snugly received in tooth spaces of the toothed belt.

11. A belt-type carrier system as claimed in claim 10, in which said spring plate being put on and fixed to opposed ends of the toothed belt, said opposed ends abutting against each other.

12. A belt-type carrier system as claimed in claim 11, in which said drive means comprises a toothed drive pulley that is meshed with the teeth of said toothed belt.

13. A belt-type carrier system as claimed in claim 12, further comprising a tension pulley for applying a tension to the belt.

14. A belt-type carrier system as claimed in claim 13, in which said toothed belt constitutes a loop having two portions that are put around said toothed drive pulley and said tension pulley respectively.

15. A belt-type carrier system comprising:

a guide rail structure having a straight rail section, a concavely curved rail section and a convexly curved rail section, said guide rail structure having two mutually perpendicular tracks that extend therealong, a toothed belt having opposed ends that abut against each other, so that said belt constitutes a looped structure;

a toothed drive pulley and a tension pulley around which the looped toothed belt is operatively put;

a spring plate arranged on said opposed ends of said toothed belt;

a flexible metal plate bracket including two leg portions which have lower ends mounted on said spring plate and a bridge portion which extends between upper ends of said two leg portions;

a plurality of bolts and nuts by which said spring plate and the lower ends of the leg portions of said flexible metal plate bracket are connected to said opposed ends of said toothed belt;

a carrier base structure having two types of followers which run on said tracks of the guide rail structure respectively when the carrier base structure moves along said guide rail structure; and a universal joint structure arranged between said bridge portion of said flexible metal bracket and said carrier base structure, said universal joint structure including a metal ball mounted on said bridge portion of said flexible metal plate bracket and a metal bush held by said carrier base structure, said metal ball being axially and pivotally movably received in said metal bracket.

16. A belt-type carrier system comprising:

a guide rail structure having a straight rail section, a concavely curved rail section and a convexly curved rail section, said guide rail structure having two mutually perpendicular tracks that extend therealong, a toothed belt having opposed ends that abut against each other, so that said belt constitutes a looped structure;

a toothed drive pulley and a tension pulley around which the looped toothed belt is operatively put;

a spring plate arranged on said opposed ends of said toothed belt;

an elastic block including two leg portions which have lower ends mounted on said spring plate and a thicker bridge portion which extends between upper ends of said two leg portions;

a plurality of bolts and nuts by which said spring plate and the lower ends of the leg portions of said elastic block are connected to said opposed ends of said toothed belt;

a carrier base structure having two types of followers which run on said tracks of the guide rail structure respectively when the carrier base structure moves along said guide rail structure; and a universal joint structure arranged between said bridge portion of said elastic block and said carrier base structure, said universal joint structure including a cylindrical metal shaft provided on said bridge portion of said elastic block and a metal bush held by said carrier base structure, said cylindrical metal shaft being axially and rotatably received in said metal bush.

* * * * *